Patented Aug. 3, 1937

2,088,844

UNITED STATES PATENT OFFICE 2,088,844

PROCESS OF EXTRACTING GOLD AND SILVER FROM THEIR ORES

Baxeres de Alzugaray, New York, N. Y.

No Drawing. Application February 8, 1933, Serial No. 655,761

1 Claim. (Cl. 75—105)

This invention relates to the process of extracting gold and silver from their ores by means of a solution of cyanide of an alkali or alkaline earth, and has for its object to render the process more expeditious and considerably cheaper.

In treating and extracting gold and silver from their ores by means of cyanides of potassium, sodium, carium, etc., the simultaneous oxidation of gold and silver is necessary, and this has hitherto been effected by the action of the air upon the gold and silver which are rendered oxidizable thereby by the action of the cyanide solution.

Instead of depending solely upon the agency of the air for the oxidizing action I employ, to assist the oxidation of the gold and silver, salts and compounds of cobalt, iron, and of vanadium, and of mixtures therefrom, in an alkaline earth, and in an alkaline cyanide solution. By this means the oxidation, being rendered very much more energetic, is effected with a considerably smaller quantity of the solvent. Thus by the addition of cobalt, iron, vanadium or other elements, of their salts, complex cyanogen and halogen compounds to the cyanide solution, a considerable amount of cyanide solvent may be saved.

Such a complex cyanogen compound may be, for example, potassium cobalticyanide, $$K_3Co(CN)_6.$$

I claim:

The process of extracting gold and silver from their ores which consists in subjecting the ore to the dissolving action of a solvent cyanide in the presence of complex cobalt cyanides and air.

BAXERES DE ALZUGARAY.